United States Patent
Corella et al.

(10) Patent No.: US 10,825,025 B2
(45) Date of Patent: Nov. 3, 2020

(54) SCHEME FOR FRICTIONLESS CARDHOLDER AUTHENTICATION

(71) Applicants: Francisco Corella, Carmichael, CA (US); Karen Pomian Lewison, Carmichael, CA (US)

(72) Inventors: Francisco Corella, Carmichael, CA (US); Karen Pomian Lewison, Carmichael, CA (US)

(73) Assignee: POMIAN & CORELLA, LLC, Sacramento, CA (US)

( * ) Notice: Subject to any disclaimer, the term of this patent is extended or adjusted under 35 U.S.C. 154(b) by 0 days.

(21) Appl. No.: 16/533,771

(22) Filed: Aug. 6, 2019

(65) Prior Publication Data

US 2020/0043003 A1 Feb. 6, 2020

Related U.S. Application Data

(60) Provisional application No. 62/862,540, filed on Jun. 17, 2019, provisional application No. 62/714,759, filed on Aug. 6, 2018.

(51) Int. Cl.
*G06Q 20/40* (2012.01)
*G06Q 20/38* (2012.01)

(52) U.S. Cl.
CPC ....... *G06Q 20/409* (2013.01); *G06Q 20/3821* (2013.01); *G06Q 20/3829* (2013.01); *G06Q 2220/00* (2013.01)

(58) Field of Classification Search
CPC ....... G06Q 20/40; G06Q 20/401–4018; G06Q 20/409–40975; G06Q 20/382–38215; G06Q 20/3825; G06Q 20/3829
See application file for complete search history.

(56) References Cited

U.S. PATENT DOCUMENTS

| | | | | |
|---|---|---|---|---|
| 7,177,839 | B1 * | 2/2007 | Claxton | G06Q 20/12 705/44 |
| 9,038,158 | B1 * | 5/2015 | MacKay | H04L 63/107 726/10 |
| 9,171,324 | B2 * | 10/2015 | Al-Herz | G06Q 30/06 |
| 10,007,914 | B2 * | 6/2018 | Cama | G06Q 20/4016 |
| 2002/0112171 | A1 * | 8/2002 | Ginter | G06F 21/10 713/185 |
| 2005/0038754 | A1 * | 2/2005 | Geist | G06Q 20/042 705/64 |

(Continued)

OTHER PUBLICATIONS

SETCo. SET Secure Electronic Transaction Specification. Book 1: Business Description. Version 1.0. May 31, 1997. Published online. Archived copy retrieved from http://ccc.cs.lakeheadu.ca/set/set_bk1.pdf.

(Continued)

*Primary Examiner* — Jay Huang

(57) ABSTRACT

A method is provided for cryptographically authenticating a cardholder in an online transaction by sending an authentication request to the issuing bank that is intercepted by a service worker and handled within the cardholder's computing device. The service worker signs a description of the transaction with a private key or forwards the request to a bank app that authenticates the cardholder biometrically in addition to signing the transaction.

5 Claims, 6 Drawing Sheets

(56) References Cited

U.S. PATENT DOCUMENTS

| | | | | |
|---|---|---|---|---|
| 2008/0222049 | A1* | 9/2008 | Loomis | G06Q 20/10 |
| | | | | 705/75 |
| 2013/0132280 | A1* | 5/2013 | Walker | G06Q 20/00 |
| | | | | 705/44 |
| 2016/0321636 | A1* | 11/2016 | Huh | G06Q 20/322 |
| 2017/0193500 | A1* | 7/2017 | Hugot | G06Q 20/401 |
| 2017/0296710 | A9* | 10/2017 | Kulkarni | A61L 31/145 |
| 2017/0339138 | A1* | 11/2017 | Lewison | H04L 9/3239 |
| 2017/0372319 | A1* | 12/2017 | Garlick | G06Q 20/4016 |
| 2018/0005235 | A1* | 1/2018 | Thorne | H04L 9/3265 |

OTHER PUBLICATIONS

EMVCo. EMV® 3-D Secure Protocol and Core Functions Specification. Version 2.2.0. Dec. 13, 2018. Published online.

EBA. Opinion of the European Banking Authority on the deadline for the migration to SCA for e-commerce card-based payment transactions. Oct. 16, 2020.

\* cited by examiner

SCHEME FOR FRICTIONLESS CARDHOLDER AUTHENTICATION

CROSS-REFERENCE TO RELATED APPLICATIONS

The subject matter of this application is related to the subject matter of U.S. Provisional Patent Applications No. 62,862,540 (filed on Jun. 17, 2019) and No. 62,714,759 (filed on Aug. 6, 2018), priority to which is claimed under 35 U.S.C. § 119(e) and which are incorporated herein by reference.

BACKGROUND

In most online credit card transactions the cardholder authenticates by entering the data printed on the credit card, viz. the credit card number, the expiration date, the security code, and the cardholder name. Knowledge of the credit card data, however, only provides weak security, since it is known by merchants and may be available to fraudsters in the dark web.

The 3-D Secure protocol, introduced by Visa in 1999 and adopted by other credit card networks, authenticates the cardholder with stronger security by redirecting the cardholder's browser to the web site of the issuing bank, where the cardholder can be authenticated more securely, usually by entering a password, sometimes in combination with a second authentication factor such as a code sent by the bank to the cardholder via text messaging or email. However, having to wait for the redirection to the bank, having to remember a password, and, if required, having to receive and enter a code, causes friction that may result in transaction abandonment. For that reason 3-D Secure is rarely used in the United States and unevenly used in other countries.

A second version of 3-D Secure is now being specified that reduces friction by requiring the merchant to send contextual data about the transaction to the issuing bank through a back channel. Based on that contextual data the bank evaluates transaction risk and waves authentication for transactions deemed to be low risk, thus eliminating friction for those transactions. The credit card networks expect that this will eliminate friction for 95% of all transactions. However friction will be eliminated for low risk transactions by giving up on strong authentication for those transactions, and friction will not be eliminated for high risk transactions.

Therefore there is a need for methods of securing both high and low risk transactions with strong authentication and without friction.

SUMMARY

In one embodiment, the cardholder chooses whether or not to install a merchant "native application" (hereinafter "app"), or a bank app, or both, on his or her computing device. The cardholder may use the the merchant app, if present, or the merchant's web site accessed via a default browser, to shop and pay by credit card. After the cardholder enters the credit card data, either the merchant app or the merchant's site causes the default browser to send an authentication request to an authentication Uniform Resource Locator (hereinafter "URL") belonging to the Domain Name System (hereinafter "DNS") domain of the issuing bank, but the request is intercepted by a service worker registered with the default browser by the bank and handled within the cardholder's computing device. If there is a bank app in the device, the service worker forwards the intercepted request to the bank app, which asks the cardholder to confirm the transaction, optionally performs biometric authentication of the cardholder, signs a description of the transaction with a private key, and sends an authentication response to the merchant app or the merchant web site containing the signature, an indication of the kind of biometric authentication that has been performed, if any, and a credit card certificate containing a public key associated with the private key and a cryptographic hash of the credit card data; the private key and the certificate are kept in storage controlled by the bank card. If there is no bank app in the device, the private key and the credit card certificate are stored in the browser or in storage accessible to the browser, and the service worker creates a web page that asks the cardholder to confirm the transaction and contains JavaScript code that signs a description of the transaction and sends an authentication response with the signature and the credit card certificate to the merchant app or the merchant's web site.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Reference numerals consist of a concatenation of a one- or two-digit number referring to a figure, followed by a two-digit number that locates the referenced part within the figure. A reference numeral introduced in a figure may be used in other figures to refer to the same part or a similar part.

DETAILED DESCRIPTION

This Detailed Description refers to the accompanying drawings, which are a part hereof and illustrate examples of embodiments of the invention. It is to be understood that other embodiments are possible, and that the features of different exemplary embodiments can be combined together unless otherwise stated.

Figure 1:
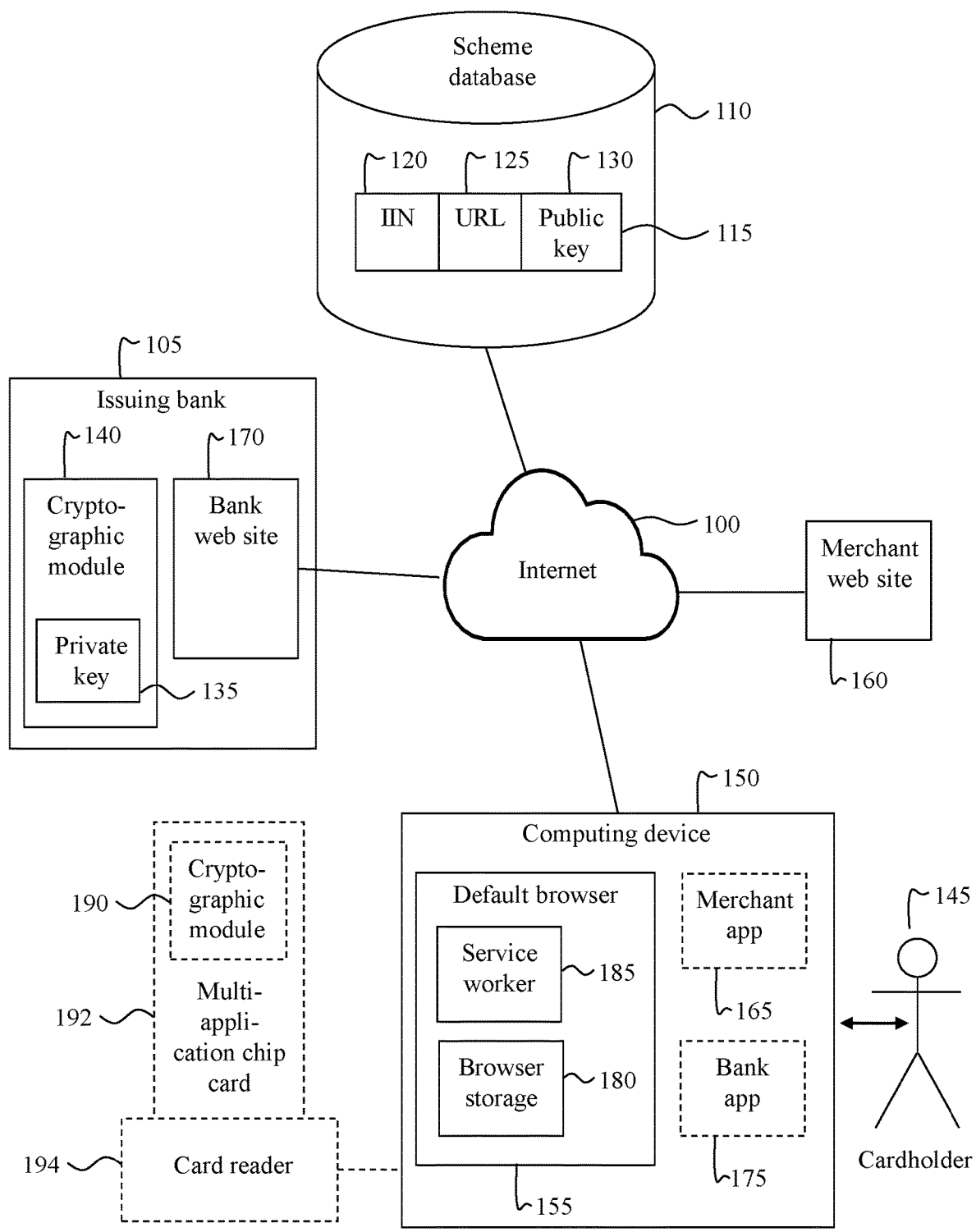
FIG. 1 is a block diagram illustrating a scheme for authenticating cardholders.

FIG. 1 is a block diagram illustrating a scheme for authenticating cardholders who use credit cards to make payments in online transactions according to some embodiments, an online transaction being a transaction conducted over a network such as the Internet 100. Banks that issue credit cards may choose to participate in the scheme; issuing bank 105 is such a bank. A scheme database 110, accessible or downloadable by merchants over the Internet, contains an entry for each issuing bank that participates in the scheme. Entry 115 corresponds to issuing bank 105 and comprises three or more fields providing information about the bank, including an Issuer Identification Number (hereinafter "IIN") 120, a URL 125, and a public key 130. The IIN 120 is used as a prefix of the credit card numbers of credit cards issued to customers of the bank such as the cardholder 145 who have enrolled in the scheme. The URL 125 belongs to the DNS domain of the issuing bank and is used by merchants as an authentication URL to which to send authentication requests interceptable by a service worker. The public key 130 is associated with a private key 135 and is used to verify signatures on credit card certificates computed with the private key. In some embodiments the private key 135 and the public key 130 comprise a key pair pertaining to a digital signature cryptosystem such as RSASSA-PSS, RSASSA-PKCS1-v1_5, DSA or ECDSA. The private key 135 is kept by the issuing bank 105 in a secure cryptographic module 140 and is used to compute signatures on credit card certificates without leaving the module.

The cardholder 145 uses a credit card issued by the issuing bank 105 to shop online with a computing device 150 such as a desktop computer, a laptop computer, a mobile phone or a tablet, equipped with a web browser 155, designated as the default browser, that implements the Service Worker Application Programming Interface (hereinafter "API"), such as the Firefox, Chrome, Safari or Edge web browser, or a web browser built into the operating system of the computing device. The cardholder 145 accesses a merchant web site 160 using the default browser 155 or a merchant app 165 downloaded from the merchant web site and installed in the computing device. (Optional elements such as the merchant app 165 are drawn with dashed arrows in the figures.)

Figure 2:
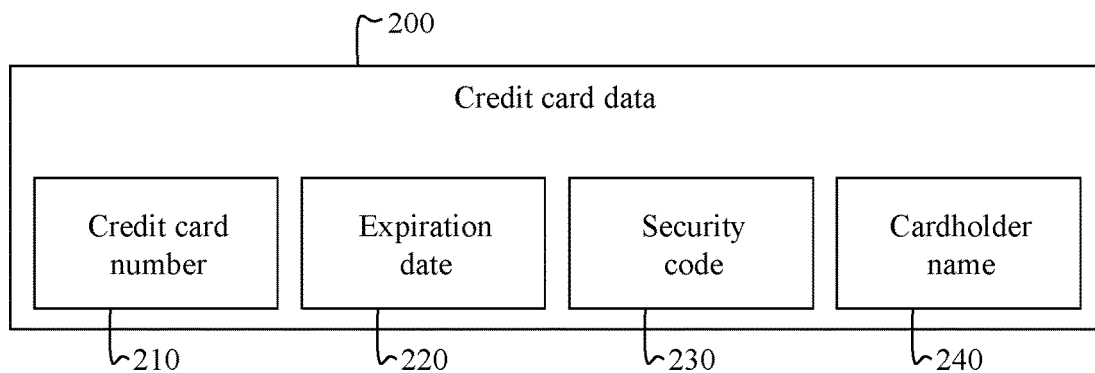
FIG. 2 is a block diagram illustrating credit card data.

FIG. 2 is a block diagram illustrating the credit card data 200 printed on the credit card issued by the issuing bank 105 to the cardholder 145. The credit card data comprises the credit card number 210, the expiration date 220, the security code 230 and the cardholder name 240.

Figure 3:
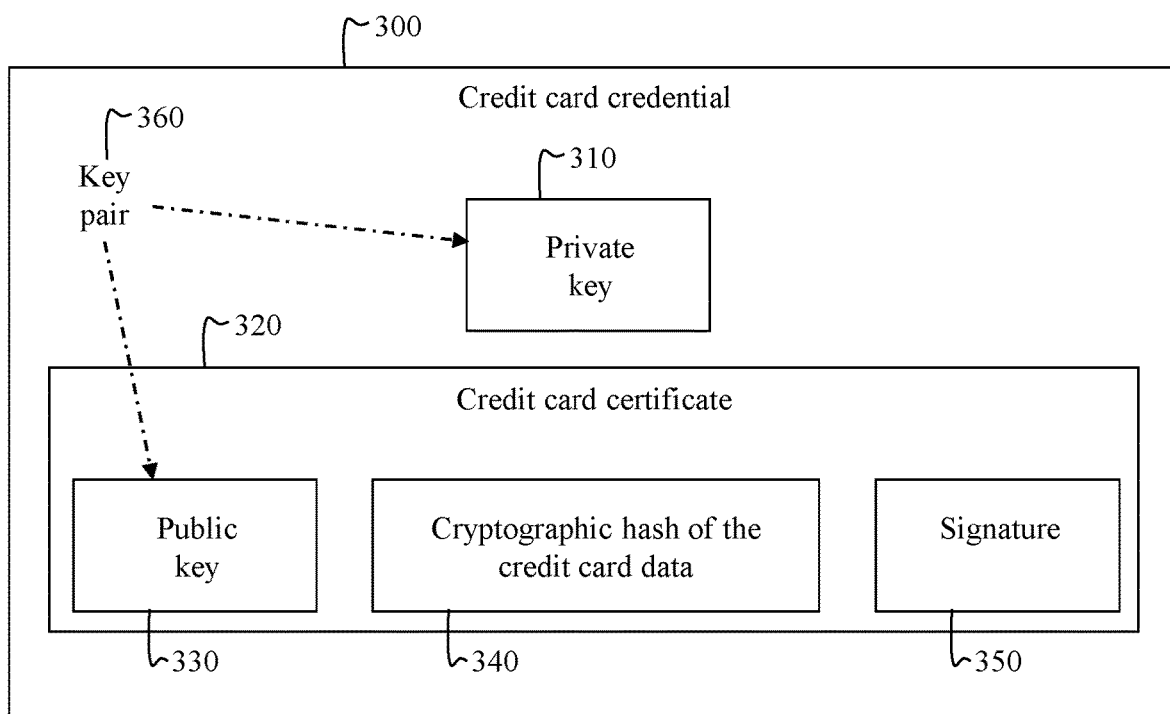
FIG. 3 is a block diagram illustrating a credit card credential.

FIG. 3 is a block diagram illustrating a credit card credential 300 used to authenticate the cardholder 145 as being the holder of the credit card identified by the credit card data 200, according to some embodiments. The credit card credential 300 comprises a private key 310 and a credit card certificate 320. The credit card certificate comprises at least a public key 330, a cryptographic hash 340 of the credit card data 200, and a signature 350 on the contents of the certificate other than the signature itself. The signature is computed with the private key 135 and verifiable with the public key 130. In some embodiments the private key 310 and the public key 330 comprise a key pair 360 pertaining to a digital signature cryptosystem such as RSASSA-PSS, RSASSA-PKCS1-v1_5, DSA or ECDSA.

The certificate becomes useless when the card expires or is invalidated. Hence there is no need to revoke it or assign a meaningful expiration time to it. In some embodiments where the certificate is in a format such as X.509 that requires a validity period, the expiration time of the certificate does not coincide with the card expiration date, to avoid revealing the latter to a fraudster who obtains the certificate; a bogus validity period is used instead with a "notAfter" field that is far enough in the future and a "notBefore" field that is far enough in the past, so that the same bogus validity period can be used for all certificates from the same issuing bank.

Referring back to FIG. 1, in some embodiments the cardholder 145 obtains the credit card credential 300 by logging in to a web site 170 operated by issuing bank 105 with the default browser 155 and enrolling in the scheme. The web site downloads a script written in JavaScript to the browser that generates the key pair 360 and submits a certificate-signing request to the web site 170. The web site creates the credit card certificate 320 using the private key 135 to sign it, and returns the certificate to the script, which assembles the credit card credential 300 comprising the the private key 310 and the certificate 320. The script checks if a bank app 175 provided by the issuing bank 105 is present in the computing device. If so, the script passes the credit card credential to the bank app, which stores it in a storage location that it controls. Otherwise the script stores the credential in browser storage 180. In some embodiments the browser storage 180 is the local Storage provided by the Web Storage API. In other embodiments the key pair 360 is generated using the Web Cryptography API and the private key 310 is wrapped in a "CryptoKey" object from which it is made non-extractable. In such embodiments the credential cannot be stored in local Storage; it is stored instead in a database accessible through the IndexedDB API. After storing the credential, the script registers a service worker 185 with the browser, specifying a scope for the service worker that includes the URL 125. Authentication requests sent to URL 125 via the browser will thereafter be intercepted by the service worker and handled within the computing device 150.

In other embodiments the credit card credential 300 is stored in a cryptographic module 190 located in a chip card (a.k.a. a smart card) 192 made accessible to the browser by means of a card reader 194. In such embodiments the cardholder does not need to enroll in the scheme. The service worker is registered automatically with the default browser 155 without cardholder intervention. This is done the first time that a merchant sends an authentication request to the URL 125 via the browser. In the absence of a service worker, the authentication request reaches the web site 170, which downloads a script that creates and registers the service worker.

In some embodiments that use a chip card 192, the chip card is a multi-application card, that can be used for online transactions as described herein, as well an ordinary credit card that can be used for in-store transactions.

Merchants do not need to enroll in the scheme in order to use it to authenticate cardholders. With continued reference to FIG. 1, cardholder 145 accesses the merchant web site 160 through the default browser 155 or through the optional merchant app 165. After selecting merchandise to be purchased, the cardholder navigates to a checkout web page if using the browser, or a checkout app screen if using the app, and enters the credit card data 200, which will be used in the cardholder authentication process, as well as cardholder data such as the cardholder's address and telephone number if required by the merchant for other purposes.

Figure 4:
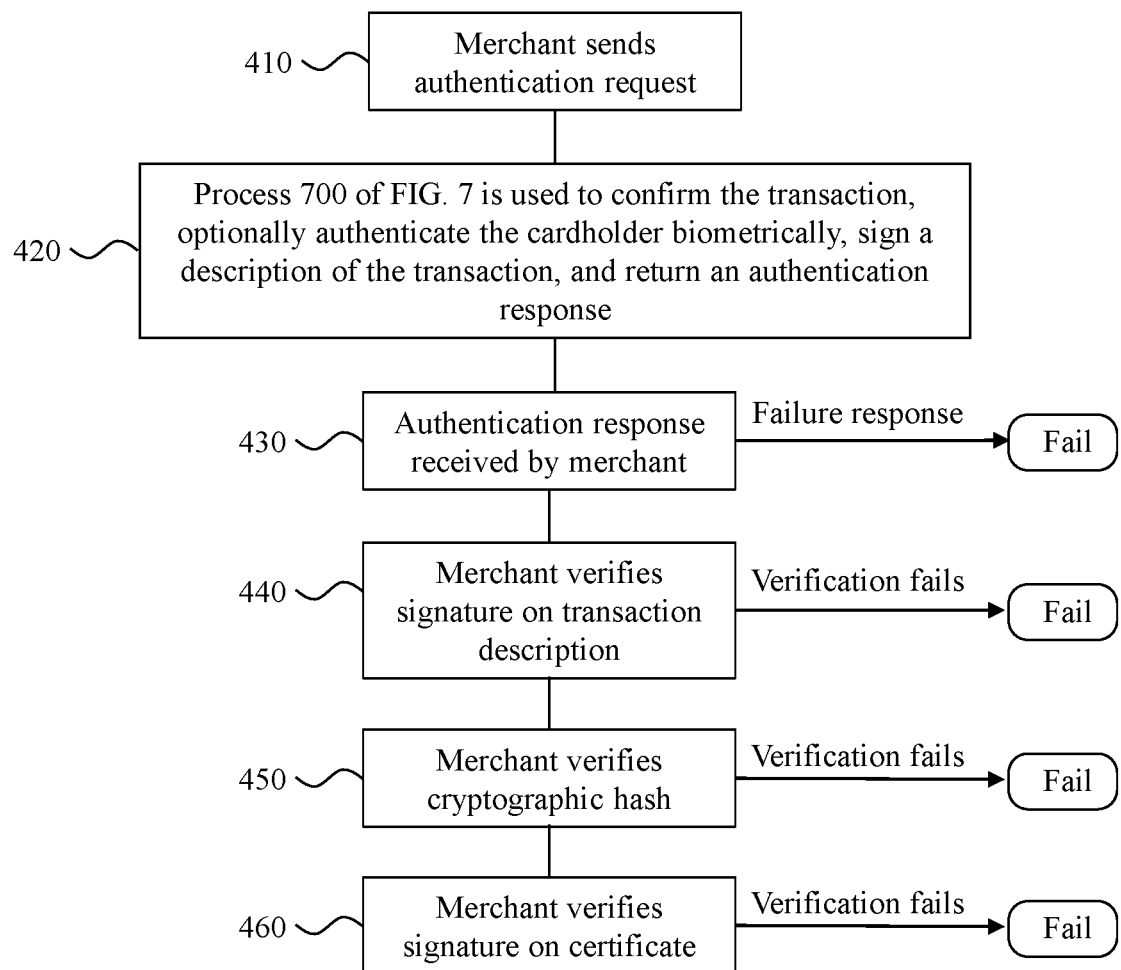
FIG. 4 is a flow diagram of a process for authenticating a cardholder.

FIG. 4 is a flow diagram of a process 400 for authenticating the cardholder 145 according to some embodiments, the process being performed after the cardholder has submitted the credit card data 200 to pay for purchases into a checkout web page of the merchant web site 160 displayed by the default browser 155 or a checkout app screen displayed by the merchant app 165.

At 410 an authentication request is sent by the merchant app or the merchant web site (referred to in the figure as "the merchant") to the authentication URL 125, containing a description of the online merchandise-purchase transaction, the credit card data 200, an optional request for biometric authentication, and a callback URL. If the cardholder has used the default browser to visit the merchant web site and submit the credit card data, the callback URL belongs to the DNS domain of the merchant web site 160 and the authentication request is sent by redirecting the browser to the authentication URL 125. The redirection is accomplished by using JavaScript code embedded in the checkout page to send the request to the URL, using the Fetch API for transmission of the request as required for interception by a service worker. If the cardholder has used the merchant app instead, the callback URL is prefixed by a custom scheme registered by the app, and the app sends the authentication request by opening a JavaScript URL in the default browser, causing the operating system of the computing device to launch the browser if not already running. The JavaScript code in the JavaScript URL sends the authentication request to the authentication URL 125, again using the Fetch API for transmission of the request as required for interception by a service worker.

Then process 400 continues at 420.

Figure 7:
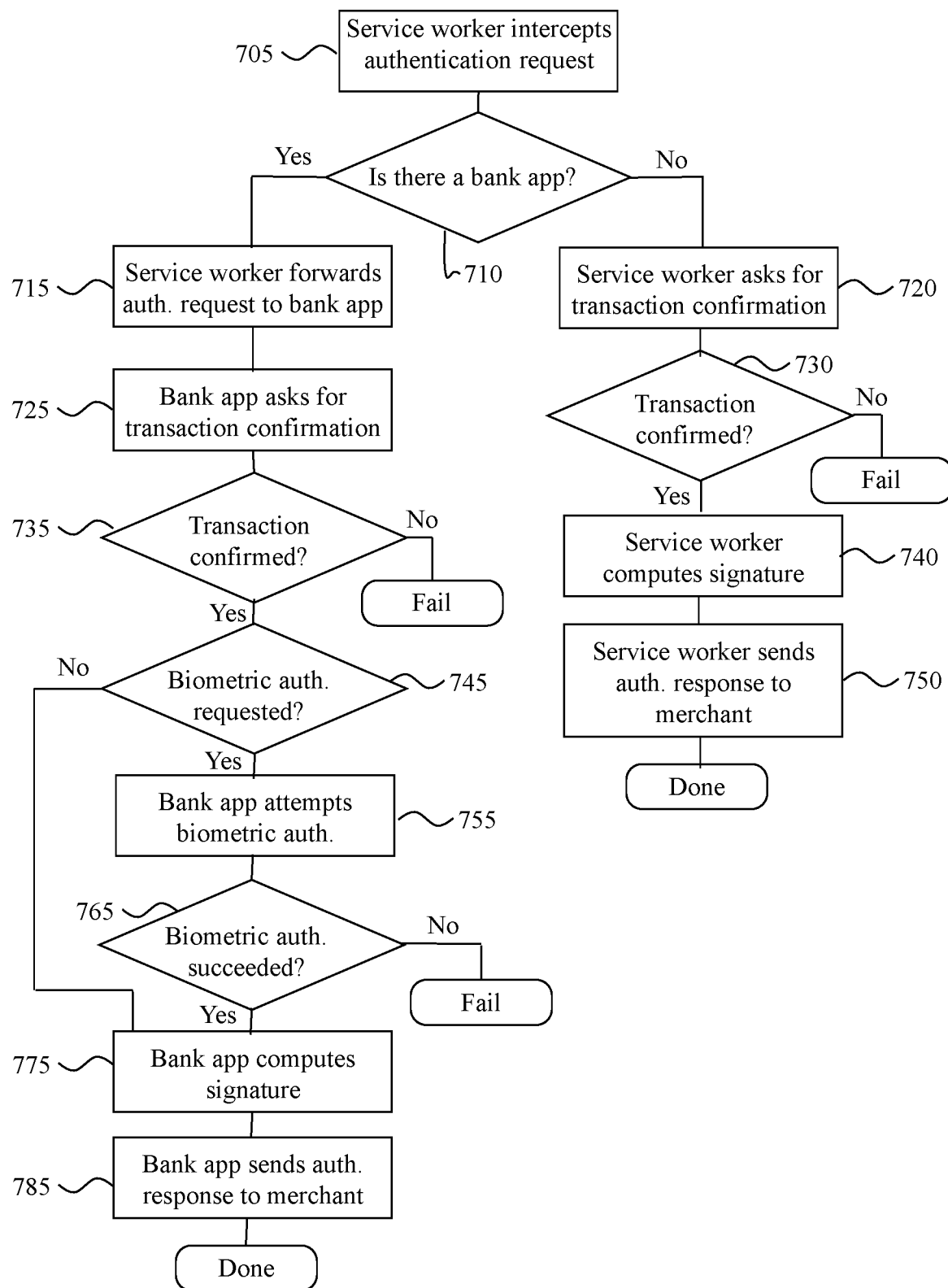
FIG. 7 is a flow diagram of a process for obtaining confirmation of the transaction, optionally performing biometric authentication, and signing a description of the transaction.

At 420 a process 700 further described below in connection with FIG. 7 is used to prompt the cardholder 145 for confirmation of the transaction, optionally perform biometric authentication, and compute a signature on the description of the transaction using the service worker 185 or the bank app 175. Process 700 may fail because the cardholder does not confirm the transaction or because biometric authentication is attempted but fails. If so, process 700 sends an authentication response reporting the failure to the callback URL. Otherwise process 700 sends an authentication response to the callback URL reporting success and containing the transaction description, the signature, an indication of the kind of biometric authentication that has been performed, if any, and the credit card certificate 320. After process 700 has sent its response, process 400 continues at 430.

At 430 the authentication response is received by the sender of the authentication request as specified by the callback URL, which is the merchant web site 160 or the merchant app 165 (referred to in the figure as "the merchant"). If the authentication response reports failure, process 400 fails. If it reports success, process 400 continues at 440.

At 440 the recipient of the authentication response verifies the signature on the description of the transaction, also verifying that the description received in the response is the same one that was sent in the request. The signature is verified using the public key 330 contained in the certificate. If the verification fails, process 400 fails. Otherwise process 400 continues at 450.

At 450 the recipient of the authentication response verifies that the cryptographic hash 340 found in the credit card certificate 320 contained in the response agrees with a cryptographic hash of the credit card data 200 submitted by the cardholder, computed with a cryptographic hash function specified by the scheme such as SHA-256. If verification of the cryptographic hash fails, process 400 fails. Otherwise process 400 continues at 460.

At 460 the recipient of the authentication response verifies the signature 350 in the credit card certificate 320 using the public key 130 in the entry 115 of the scheme database 110. If the verification of the signature fails, process 400 fails. Otherwise process 400 terminates successfully.

Upon successful termination of process 400, the recipient of the authentication response, which may be the merchant web site 160 or the merchant app 165, makes a risk assessment based on the kind of biometric authentication that has been performed, if any, the monetary value of the transaction, and other factors, and decides whether to proceed with the transaction by submitting it for authorization processing. If the transaction is submitted for authorization processing it is routed through the acquiring bank and the credit network to the issuing bank as usual, and the issuing bank makes its own risk assessment to decide whether to authorize the payment.

Figure 5:
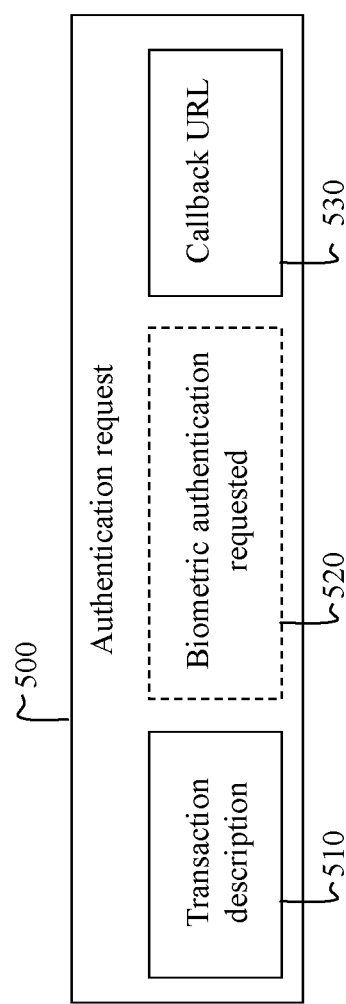
FIG. 5 is a block diagram illustrating an authentication request.

FIG. 5 is a block diagram illustrating an authentication request 500, sent at step 410 of process 400. The authentication request 500 contains a transaction description 510, the credit card data 200, an optional request 520 for biometric authentication, and a callback URL 530.

Figure 6:
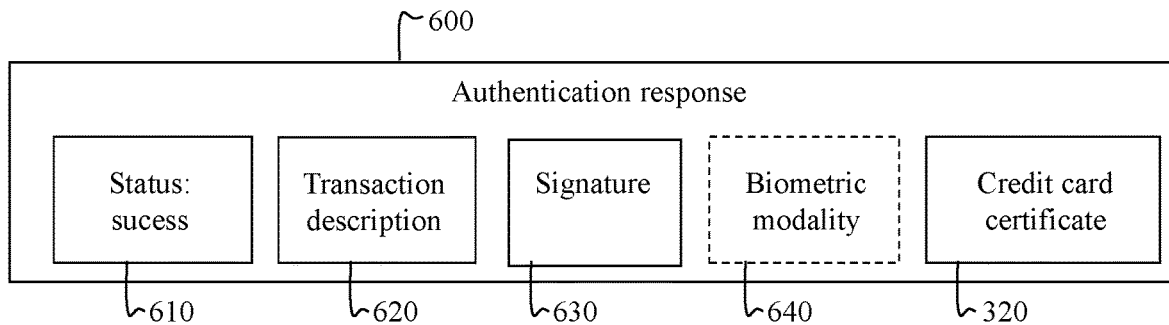
FIG. 6 is a block diagram illustrating an authentication response with an optional indication of biometric authentication.
Figure 6A:
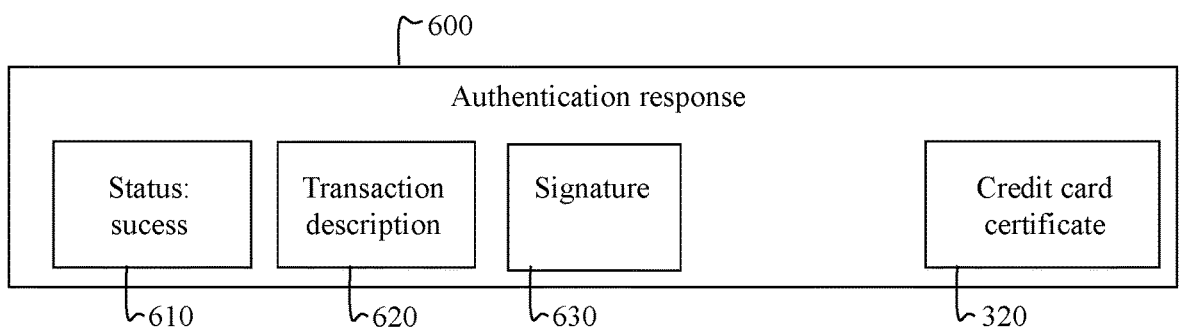
FIG. 6A is a block diagram illustrating an authentication response with no indication of biometric authentication.
Figure 6B:
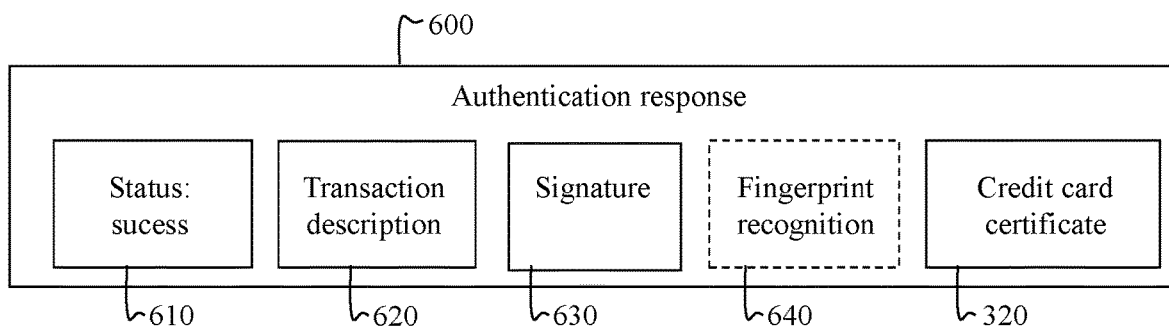
FIG. 6B is a block diagram illustrating an authentication response indicating that fingerprint recognition has been performed.
Figure 6C:
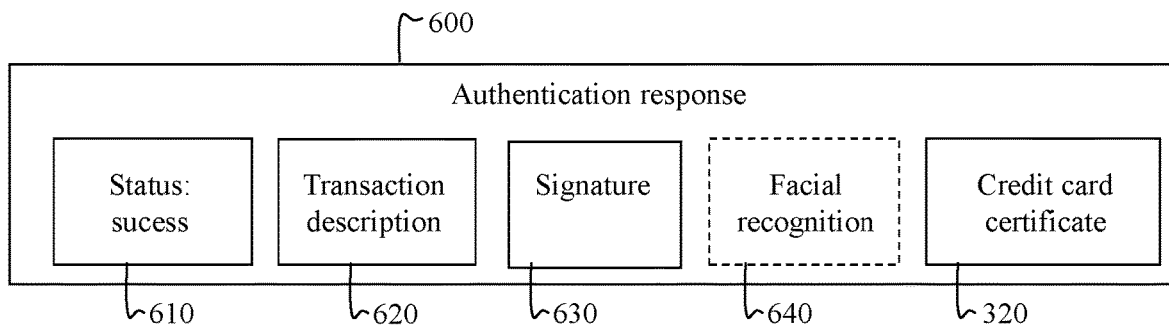
FIG. 6C is a block diagram illustrating an authentication response indicating that facial recognition has been performed.

FIG. 6 is a block diagram illustrating an authentication response 600 reporting success received at step 430 of process 400. The authentication response 600 contains a status 610 of success, a transaction description 620, a signature 630, an optional indication 640 of the kind of biometric authentication that has been performed, if any, and the credit card certificate 320. The indication 640 may be missing as in the example of FIG. 6A, or may refer to a biometric modality such as "fingerprint recognition" as in the example of FIG. 6B, "facial recognition" as in the example of FIG. 6C, or some other biometric modality.

FIG. 7 is a flow diagram of a process 700 performed at step 420 of process 400 to obtain confirmation of the transaction, optionally perform biometric authentication, and sign a description of the transaction.

At 705 the service worker 185 intercepts the authentication request 500. Then the process continues at 710.

At 710 the service worker checks if the bank app 175 is present in the computing device. In one embodiment, awareness of the presence of the app is built into the service worker code, by installing an app-aware version of the code or upgrading an existing version to become app-aware when the bank app is installed. If the bank app is present, process 700 continues at 715. Otherwise it continues at 720.

At 715 the service worker forwards the intercepted authentication request 500 to the bank app 175, sending the forwarded request to a URL prefixed by a custom scheme registered by the bank app. Then the process continues at 725.

At 725 the bank app displays an app screen showing the transaction description 510 and asking the cardholder 145 for confirmation of the transaction. Then the process continues at 735.

At 735 the bank app checks if the cardholder has confirmed the transaction. If so, the process continues at 745. Otherwise the process fails.

At 745 the bank app checks if the authentication request includes a request for biometric authentication. If so the process continues at 755. Otherwise the process continues at 775.

At 755 the bank app attempts to authenticate the cardholder 145 biometrically, using a biometric modality implemented by the computing device 150 such as fingerprint recognition or facial recognition. Then the process continues at 765.

At 765 the bank app checks if the biometric authentication succeeded. If so, the process continues at 775. Otherwise the process fails.

At 775 the bank app computes a signature on the transaction description 510 using the private key 310. Then the process continues at 785.

At 785 the bank app constructs an authentication response 600 with status 610 of success and with an indication 640 of the biometric modality that was used at step 755 if step 755 was performed, and sends it to the callback URL 530. Then the process terminates successfully.

At 720 the service worker displays a web page showing the transaction description 510 and asking the cardholder 145 for confirmation of the transaction. Then the process continues at 730.

At 730 the service worker checks if the cardholder has confirmed the transaction. If so, the process continues at 740. Otherwise the process fails.

At 740 the bank app computes a signature on the transaction description 510 using the private key 310. If the credit card credential 300 is stored in the cryptographic module 190, a request to compute the signature is sent to the chip card 192 through a card reader, and the signature is computed without the private key leaving the cryptographic module. Then the process continues at 750.

At 750 the bank app constructs an authentication response 600 with a status 610 of success and no indication of biometric modality, and sends it to the callback URL 520. Then the process terminates successfully.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of authenticating a cardholder who uses a computing device to submit credit card data printed on a credit card issued by an issuing bank in an online transaction, comprising the steps of:
   sending an authentication request to an authentication URL belonging to the DNS domain of the issuing bank, the authentication URL being in the scope of a service worker registered by the issuing bank with a browser running in the computing device, the authentication request containing a description of the transaction;
   receiving an authentication response containing a signature on the description of the transaction and a credit card certificate that contains a public key; and
   verifying the signature on the description of the transaction using the public key contained in the credit card certificate,
   wherein the authentication request is sent by a merchant and the merchant uses as the authentication URL a value that the merchant finds in an entry of a scheme database indexed by an IIN prefix of a credit card number included in the credit card data.

2. The method of claim 1 further comprising the steps of:
   finding a public key in the same entry of the scheme database that contains the authentication URL; and
   using the public key found in the entry to verify a signature on the credit card certificate.

3. The method of claim 1 wherein the credit card certificate contains a cryptographic hash of the credit card data, the credit card data itself not being included in the certificate, and the method further comprises a step of verifying that the cryptographic hash contained in the certificate is derived from the credit card data submitted by the cardholder.

4. The method of claim 1 wherein the cardholder submits the credit card data by entering it into a web site and the authentication request is sent by redirecting the browser to the authentication URL.

5. The method of claim 1 wherein the cardholder submits the credit card data by entering it into an app and the app sends the authentication request by opening a JavaScript URL in the browser.

* * * * *